United States Patent
Watson et al.

[15] 3,671,589
[45] June 20, 1972

[54] PROCESS FOR PREPARATION OF 2-SUBSTITUTED-1,3-CYCLOPENTANEDIONES

[72] Inventors: Edward J. Watson; Dale H. LaBar, both of West Chester, Pa.

[73] Assignee: American Home Products Corporation, New York, N.Y.

[22] Filed: May 23, 1969

[21] Appl. No.: 827,133

Related U.S. Application Data

[63] Continuation-in-part of Ser. No. 656,708, July 28, 1967, abandoned.

[52] U.S. Cl. .................................260/586 R, 260/590
[51] Int. Cl. ...............................C07c 49/28, C07c 45/18
[58] Field of Search.............................260/586 R, 590

[56] References Cited

UNITED STATES PATENTS

| | | | |
|---|---|---|---|
| 3,349,130 | 10/1967 | Bucourt et al. | 260/586 R |
| 3,356,731 | 12/1967 | Nilsson | 260/586 R |
| 3,382,282 | 5/1968 | Grenda et al. | 260/586 R |
| 3,504,036 | 3/1970 | Schick et al. | 260/586 R |

*Primary Examiner*—Leon Zitver
*Assistant Examiner*—Norman Morgenstern
*Attorney*—Joseph Martin Weigman

[57] ABSTRACT

This invention is concerned with the process of preparing 2-substituted-1,3-cyclopentanediones in good yields by reacting a succinic anhydride with an appropriate carboxylic acid anhydride, in the presence of aluminum chloride, in a reaction-inert organic solvent.

4 Claims, No Drawings

PROCESS FOR PREPARATION OF 2-SUBSTITUTED-1,3-CYCLOPENTANEDIONES

This is a continuation-in-part application of U.S. Pat. Ser. No. 656,708, filed on July 28, 1967 by Edward J. Watson and Dale H. La Bar, also entitled "Process for the Preparation of 2-Substituted-1,3-Cyclopentanediones, now abandoned."

BACKGROUND OF THE INVENTION

The present invention relates to a new and novel process for the preparation of 2-substituted-1,3-cyclopentane-diones in good yields.

Schick et al. in Angew, Chem. Internat. Edit. Engl. 6, 80 (1967) have demonstrated the preparation of 2-alkyl-1,3-cyclopentanediones by the reaction of succinyl chloride with carboxylic acids, in the presence of aluminum chloride, in solvents such as nitromethane, nitrobenzene and dichloroethane. However, it has been demonstrated as exemplified in the following Tables that this procedure does not afford the yields which are obtained by the process of the present invention.

TABLE I.—PRIOR ART PROCESS

| Product | Reactants | Solvent | Moles of AlCl$_3$ | Reaction Temperature, °C. | Time (hrs.) | Percent total yield of product |
| --- | --- | --- | --- | --- | --- | --- |
| 2-methyl-1,3-cyclopentanedione | Propionic acid (0.5 m.) and succinyl chloride (0.25 m.). | Nitromethane (75 ml.). | 0.6 | 80 | 3 | 28.5 |
| 2-ethyl-1,3-cyclopentanedione | Butyric acid (0.5 m.) and succinyl chloride (0.25 m.). | ...do... | 0.6 | 80 | 3 | 18.5 |
| 2-propyl-1,3-cyclopentanedione | Valeric acid (0.5 m.) and succinyl chloride (0.25 m.). | ...do... | 0.6 | 80 | 3 | 21.5 |

TABLE II.—PROCESS OF PRESENT INVENTION

| Product | Reactants | Solvent | Moles of AlCl$_3$ | Reaction Temperature, °C | Time (hrs.) | Percent total yield of product |
| --- | --- | --- | --- | --- | --- | --- |
| 2-methyl-1,3-cyclopentanedione | Propionic anhydride (0.25 m.) and succinic anhydride (0.25 m.). | Nitromethane (75 ml.). | 0.6 | 80 | 3 | 41 |
| Do | Propionic anhydride (0.25 m.) and succinic anhydride (0.25 m.). | Nitrobenzene (200 ml.). | 0.6 | 120 | 3 | 58.5 |
| 2-ethyl-1,3-cyclopentanedione | Butyric anhydride (0.25 m.) and succinic anhydride (0.25 m.). | ...do... | 0.6 | 100 | 15 | 59.5 |
| 2-propyl-1,3-cyclopentanedione | Valeric anhydride (0.25 m.) and succinic anhydride (0.25 m.). | ...do... | 0.6 | 100 | 6 | 53.7 |

From a review of the data of the above Tables I and II, it is apparent that the process of the present invention unlike the prior procedure is able to provide the desired 2-substituted-1,3-cyclopentanediones in economical and commercial yields.

SUMMARY OF THE INVENTION

The present invention is concerned with a new and novel process for the preparation of 2-substituted-1,3-cyclopentanediones in good yields. The process is exemplified by the following reaction scheme:

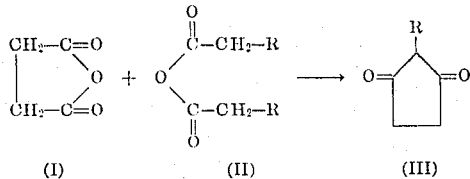

wherein R is defined as lower alkyl or phenyl(lower)alkyl. The reaction is effected by adding a succinic anhydride (I) and a carboxylic acid anhydride (II) to a mixture of about 1.5 to about 4 molar equivalents of a Friedel-Crafts catalyst and a reaction-inert organic solvent and then heating the reaction mixture to a temperature from about 60° C. to about 130° C. for a period of about one to about 18 hours. Preferably this reaction is conducted using about 2.4 molar equivalents of aluminum chloride in nitrobenzene or nitromethane.

When the above reaction is complete, the reaction mixture is admixed with water to hydrolyze the above product and afford a 2-substituted-1,3-cyclopentanedione (III) which may then be separated by filtration. To increase the yield of product (III) the filtrate may be extracted with a water immiscible solvent e.g. ether which is then evaporated to dryness leaving a residue of product (III). These 2-substituted-1,3-cyclopentanediones may then be purified by conventional procedures, e.g. treatment with activated charcoal and recrystallization.

Many of the reactants employed in the process of this invention are known compounds which are readily available from commercial sources while the remainder can easily be prepared in accord with standard procedures well known to those skilled in the chemical art. The Friedel-Crafts catalysts which may be employed in this process include aluminum chloride, ferric chloride, stannic chloride, boron fluoride, zinc chloride, hydrogen fluoride, sulfuric acid, phosphorous pentoxide and phosphoric acid. By reaction-inert organic solvent as employed herein is meant any solvent which will dissolve the reactants and not interfere with their interaction. Examples thereof are: nitromethane, nitrobenzene, tetrachloroethylene, dichloroethane, nitrotoluene, and 1-nitropropane, while other suitable solvents will readily suggest themselves to those skilled in the art.

The new and novel process of the present invention is utilized to prepare known 2-substituted-1,3-cyclopentanediones which have previously been described in the prior art. For example: 2-methyl-1,3-cyclopentanedione has been described in U.S. Pat. No. 2,668,858 which issued on Feb. 9, 1954, wherein said compound is utilized as an intermediate in the preparation of hydrindenediones. Further, 2-ethyl-1,3-cyclopentanedione and 2-propyl-1,3-cyclopentanedione are claimed and described in U.S. Pat. No. 3,285,963 wherein the former compound is demonstrated to have anti-androgenic and anti-viral activity while both the former and latter compounds are employed as intermediates in the synthetic preparation of steroidal compounds which possess hormonal activity. All 2-alkyl-1,3-cyclopentanediones prepared by this process are useful as intermediates in the preparation of 13-alkylgona-1,3,5(10),8,14-pentaenes as described in U.S. Pat. No. 3,202,686 which issued on Apr. 27, 1964. Further, the remaining compounds prepared by the process of this reaction are employed to prepare 13-phenyl (lower alkyl) steroids which are hormonally efficacious and described in Japanese Pat. No. 14,012 which issued on July 15, 1965 to Takeda Chemical Industries, Ltd.

As can be seen from the following examples, given by way of illustration, the anhydride reactants are reacted in equimolar amounts.

EXAMPLE I

Succinic anhydride (0.25 m.) and propionic anhydride (0.25 m.) are added to a suspension of aluminum chloride (0.6 m.) in nitromethane (75 ml.) and the mixture is heated to 80° C. for a period of 3 hours. Subsequently, the reaction mixture is cooled and poured into ice water (250 ml.). The resulting solid is separated by filtration, washed with cold water, then cold ether and dried to yield the product (35 percent yield). The water phase of the filtrate is then extracted with ether and the ether layer evaporated to dryness to afford more product (6 percent yield) for a total yield of 41 percent of 2-methyl-1,3-cyclopentanedione.

In the same manner, the above reaction is conducted in nitrobenzene (200 ml.) at 100° C. for three hours to afford a 52 percent yield of 2-methyl-1,3-cyclopentanedione. Further, when this latter reaction is conducted at 120° C. for 3 hours, the total yield of product is 58.5 percent. Still further, a 49.5 percent yield of product is obtained when the reaction is conducted in the presence of 0.875 moles of aluminum chloride at 120° C. for 3 hours.

EXAMPLE II

Succinic anhydride (0.25 m.) and butyric anhydride (0.25 m.) are added to a suspension of aluminum chloride (0.6 m.) in nitrobenzene (200 ml.) and the mixture is heated to 100° C. for 4 hours. Thereafter, the reaction is poured into water (250 ml.) and the resulting precipitate separated by filtration. The product thus obtained is washed with water, then cold ether and dried to afford a 50.2 percent yield of 2-ethyl-1,3-cyclopentanedione.

The above reaction is repeated at a reaction temperature of 100° C. for 15 hours to afford a total yield of 59.5 percent of product.

EXAMPLE III

Succinic anhydride (0.25 m.) and valeric anhydride (0.25 m.) are added to a suspension of aluminum chloride (0.6 m.) in nitrobenzene (200 ml.) and the mixture is heated to 100° C. for 6 hours. Thereafter, the reaction mixture is poured into cold water (150 ml.) and the resulting precipitate separated by filtration. The product is then washed with water, then cold methyl isobutyl ketone and dried to afford a 53.7 percent yield of 2-propyl-1,3-cyclopentanedione.

EXAMPLE IV

When the procedures of the prior Examples are repeated to react succinic anhydride with an appropriate anhydride in the presence of 1.5 to 4 molar equivalents of aluminum chloride at a temperature of about 60° C. to 130° C. for a period of 1 to 18 hours, the following compounds are obtained:
2-benzyl-1,3-cyclopentanedione;
2-butyl-1,3-cyclopentanedione;
2-phenethyl-1,3-cyclopentanedione;
2-phenpropyl-1,3-cyclopentanedione;
2-isobutyl-1,3-cyclopentanedione;
2-ethyl-1,3-cyclopentanedione; and
2-isopropyl-1,3-cyclopentanedione.

What is claimed is:

1. A process for the preparation of 1,3-cyclopentanediones having the formula:

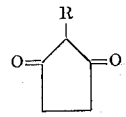

wherein R is selected from the group consisting of methyl, ethyl, and propyl which comprises reacting in equimolar amounts a compound having the formula:

$$R\text{-}CH_2\text{-}COO\text{-}CO\text{-}CH_2\text{-}R$$

wherein R is defined as above, with succinic anhydride, in the presence of from about 1.5 to about 4 molar equivalents of a Friedel-Crafts catalyst per mole of said succinic anhydride, said reaction being carried out in a reaction-inert organic solvent selected from the class consisting of nitromethane and nitrobenzene for a period of about one to about eighteen hours at a temperature range from about 60° C. to about 130° C., and then hydrolyzing the product of the said reaction by a mixture with water.

2. A process as described in claim 1, for the preparation of 2-methyl-1,3-cyclopentanedione which comprises reacting succinic anhydride with propionic anhydride, in the presence of about 2.4 molar equivalents of aluminum chloride, in nitromethane.

3. A process as described in claim 1 for the preparation of 2-ethyl-1,3-cyclopentanedione which comprises reacting succinic anhydride with butyric anhydride, in the presence of about 2.4 molar equivalents of aluminum chloride, in nitrobenzene.

4. A process as described in claim 1 for the preparation of 2-propyl-1,3-cyclopentanedione which comprises reacting succinic anhydride with valeric anhydride, in the presence of about 2.4 molar equivalents of aluminum chloride, in nitrobenzene.

* * * * *